US008742931B2

(12) United States Patent
Lee et al.

(10) Patent No.: US 8,742,931 B2
(45) Date of Patent: Jun. 3, 2014

(54) ELECTRONIC SEAL WITH MULTIPLE MEANS OF IDENTIFICATION AND METHOD BASED ON ELECTRONIC SEAL FOR INSPECTING GOODS

(75) Inventors: Ming-Town Lee, Taoyuan County (TW); Yu-Cheng Chang, Taoyuan County (TW); Wei-Yi Tseng, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 356 days.

(21) Appl. No.: 13/220,852

(22) Filed: Aug. 30, 2011

(65) Prior Publication Data

US 2013/0049965 A1 Feb. 28, 2013

(51) Int. Cl.
*G08B 13/14* (2006.01)
(52) U.S. Cl.
USPC .................. 340/572.8; 340/572.7; 340/572.9; 340/572.1
(58) Field of Classification Search
USPC ........................................................ 340/572.7
See application file for complete search history.

(56) References Cited

U.S. PATENT DOCUMENTS

| 5,493,312 | A | * | 2/1996 | Knebelkamp | ................. 343/860 |
| 7,098,794 | B2 | * | 8/2006 | Lindsay et al. | ............ 340/572.3 |
| 7,298,274 | B2 | * | 11/2007 | Chen et al. | ................. 340/572.8 |
| 7,486,172 | B2 | | 2/2009 | Martinez et al. | |
| 7,541,932 | B2 | * | 6/2009 | Lee et al. | .................... 340/572.8 |
| 7,579,952 | B2 | | 8/2009 | Osterholt et al. | |
| 7,597,253 | B2 | * | 10/2009 | Lin et al. | ....................... 235/382 |
| 7,696,886 | B2 | * | 4/2010 | Lai | ............................. 340/572.7 |
| 7,830,260 | B2 | | 11/2010 | Wang et al. | |
| 2006/0152366 | A1 | * | 7/2006 | Sironi et al. | ............... 340/572.1 |

* cited by examiner

*Primary Examiner* — Jennifer Mehmood
*Assistant Examiner* — John Mortell
(74) *Attorney, Agent, or Firm* — Jackson IPG PLLC

(57) ABSTRACT

An electronic seal includes a radio frequency identification apparatus, an antenna assembly and an impedance matching circuit. The radio frequency identification apparatus includes at least two radio frequency identification units each for providing a specific code for identification. The antenna assembly is electrically connected to the radio frequency identification units. The antenna assembly is used to receive an electromagnetic signal for identification to excite the radio frequency identification units to transmit the specific codes through the antenna assembly. The impedance matching circuit is provided between the radio frequency identification units and the antenna assembly for adjusting the impedance matching of the radio frequency identification units to the antenna assembly, thus adjusting excitation powers and feedback powers of the specific codes from the radio frequency identification units through the antenna assembly.

9 Claims, 9 Drawing Sheets

ELECTRONIC SEAL WITH MULTIPLE MEANS OF IDENTIFICATION AND METHOD BASED ON ELECTRONIC SEAL FOR INSPECTING GOODS

BACKGROUND OF INVENTION

1. Field of Invention

The present invention relates to a seal and, more particularly, to an electronic seal that includes several radio frequency identification units and a method based on an electronic seal for inspecting goods.

2. Related Prior Art

Referring to FIG. 1, there is shown a conventional electronic seal 900 for sealing a door of a container so that the door cannot be opened without cutting the electronic seal 900. The electronic seal 900 includes a plug 910, a socket 920, a radio frequency identification chip 930 and an antenna 940. The radio frequency identification chip 930 is located in the plug 910 while the antenna 940 is located in the socket 920. The radio frequency identification chip 930 is electrically connected to the antenna 940 as the plug 910 is inserted in the socket 920. An RFID reader is used to transmit reading waves to the radio frequency identification chip 930 through the antenna assembly 940 to excite the radio frequency identification chip 930 to transmit a specific code carried on the radio frequency identification chip 930. With the specific code, it can be determined whether the electronic seal 900 has been replaced. Thus, it can be determined whether the container has been replaced with another container or goods have been stolen from the container. There is an on-going trend to use the electronic seal 900 instead of a mechanical seal of which the integrity is generally checked by visually observing a number made on the mechanical seal or the outlook of the mechanical seal. Electronic seals are advantageous over mechanical seals where a lot of containers have to be checked in a short period of time.

In the customs all over the world, the radio frequency identification chip 930 of the electronic seal 900 is manufactured in compliance with the communication protocol and data format regulated in ISO 18000-6C/EPC, Class 1, Generation 2 which is made public. Hence, manufactures can develop their own devices to fulfill the requirements set by different customs. However, public standards make it easy for anybody to illegally read and record the specific code stored in the radio frequency identification chip 930 and then counterfeit another radio frequency identification chip similar to the radio frequency identification chip 930 and finally counterfeit another electronic seal similar to the electronic seal 900. In that case, the container could be opened after the electronic seal 900 is cut, and the container could be sealed again with the counterfeited seal instead of the electronic seal 900. It could be difficult, if not impossible, to find that the container has been opened and goods stolen from it or another container has been delivered instead of the container.

The present invention is therefore intended to obviate or at least alleviate the problems encountered in prior art.

SUMMARY OF INVENTION

It is an objective of the present invention to provide a reliable electronic seal for security and a method of inspection of goods.

To achieve the foregoing objective, the electronic seal includes a radio frequency identification apparatus, an antenna assembly and an impedance matching circuit. The radio frequency identification apparatus includes at least two radio frequency identification units (chips) each for providing a specific code for identification. The antenna assembly is electrically connected to the radio frequency identification units. The antenna assembly is used to receive an electromagnetic signal for identification to excite the radio frequency identification units to transmit the specific codes through the antenna assembly. The impedance matching circuit is provided between the radio frequency identification units and the antenna assembly for adjusting the impedance matching of the radio frequency identification units to the antenna assembly, thus adjusting excitation powers and feedback powers of the specific codes from the radio frequency identification units through the antenna assembly.

The electronic seal may further include a plug and a socket. The plug is used for containing the radio frequency identification apparatus and the impedance matching circuit. The plug includes a hollow body, an insertion end formed at an end of the hollow body, and a stop end formed at an opposite end of the hollow body. The cross-sectional area of the stop end of the plug is larger than the cross-sectional area of the hollow body. The socket includes a hollow body and a locking apparatus. The hollow body of the socket includes an internal space defined therein and an opening through which the insertion end of the plug is inserted in the internal space of the hollow body of the socket. The locking apparatus is located in the internal space of the hollow body of the socket corresponding to the opening of the hollow body of the socket for receiving the insertion end of the plug, thus locking the plug to the socket. The radio frequency identification units are electrically connected to the antenna assembly as the plug is inserted in and locked to the socket. The plug may further include a lock groove defined in an external side of the insertion end. The insertion end may include an opening defined therein, direct to internal space of the plug. The plug may further include an insulated block fit in the opening of the insertion end of the plug. The radio frequency identification apparatus may further include a first electric connector electrically connected to the radio frequency identification units and inserted through the insulated block.

The electronic seal may further include a plurality of impedance units corresponding to the radio frequency identification units for adjusting the values of impedance of the radio frequency identification units to the antenna assembly. Each of the impedance units may include a resistor connected to the antenna assembly in serial, an inductor connected to the antenna assembly in serial, and a capacitor connected to the antenna assembly in parallel.

The antenna assembly may include a one-point feed-in antenna and a coupling antenna. The one-point feed-in antenna is electrically connected to the radio frequency identification units while the coupling antenna is coupled to the one-point feed-in antenna.

It is another objective of the present invention to provide a method by use of an electronic seal for inspecting goods contained in a package equipped with a latch.

To achieve the foregoing objective, the method includes the step of providing an electronic seal with a plurality of radio frequency identification units and an antenna assembly. The radio frequency identification units are engaged with the antenna assembly after they are inserted through the latch, wherein a specific value of impedance exists between each of the radio frequency identification units and the antenna assembly. The method further includes the step of determining the intensities of signals of specific codes from the radio frequency identification units through the antenna assembly based on the values of the values of impedance. The method further includes the step of emitting an electromagnetic signal for identification from a radio frequency identification reader to excite the radio frequency identification units to transmit the specific codes through the antenna assembly. Moreover, based on the specific codes and their intensities, it is determined whether the specific codes transmitted from the radio frequency identification units through the antenna assembly are in compliance with the relation between the contents of the specific codes and their intensities.

The relation among the intensities of the specific codes may be that the intensities of the specific codes are consistent, that the intensities of the specific codes are different, and that some of the specific codes are disabled.

Other objectives, advantages and features of the present invention will be apparent from the following description referring to the attached drawings.

BRIEF DESCRIPTION OF DRAWINGS

The present invention will be described via detailed illustration of five embodiments versus the prior art referring to the drawings wherein.

DETAILED DESCRIPTION OF EMBODIMENTS

Figure 1:
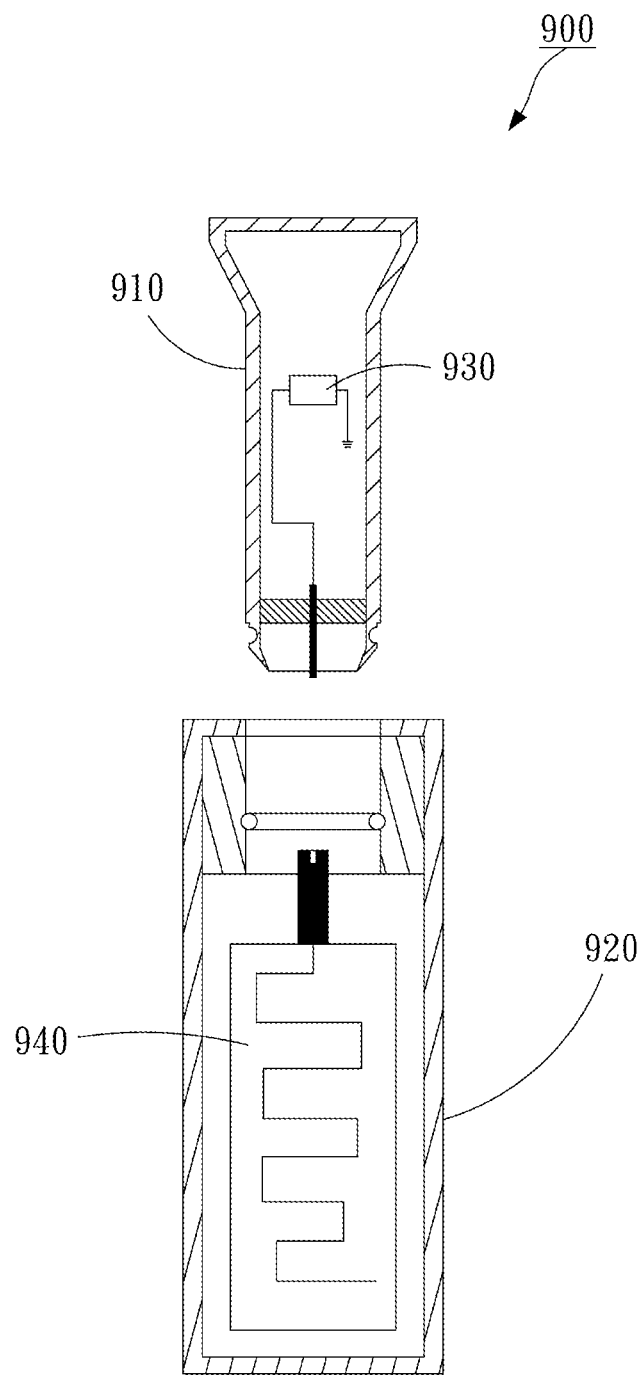
FIG. 1 is a cross-sectional view of a conventional electronic seal.
Figure 2:
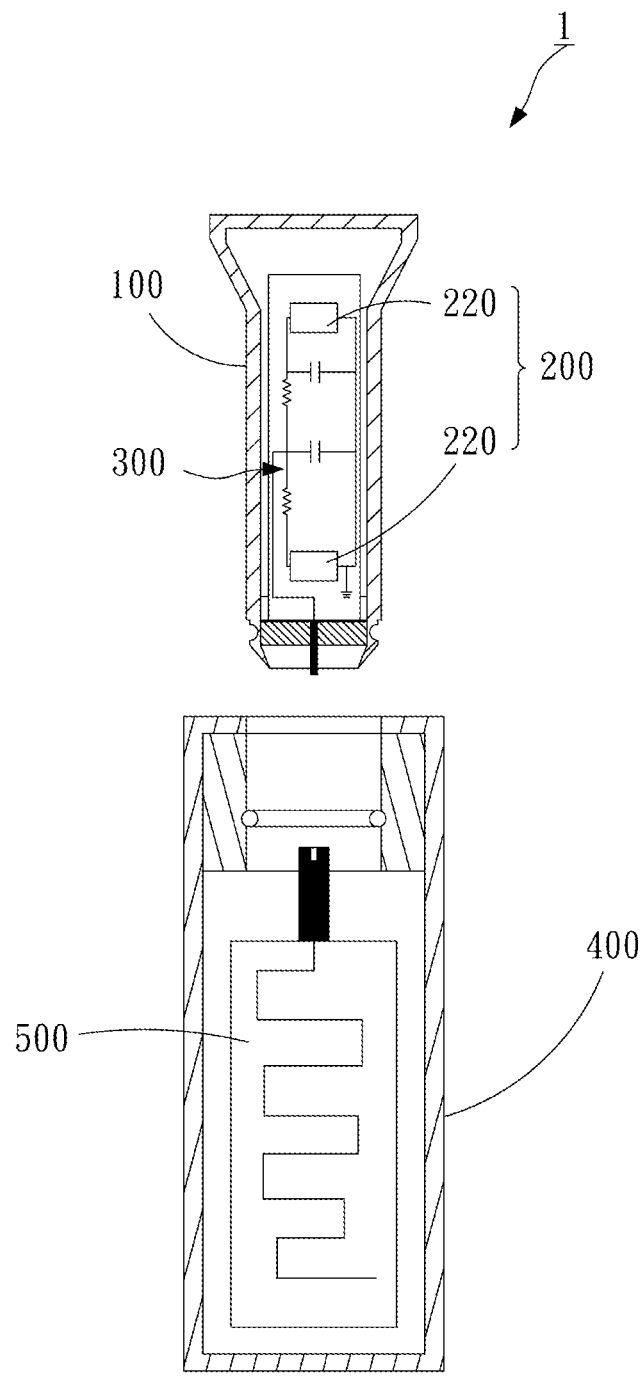
FIG. 2 is a cross-sectional view of an electronic seal including a plurality of radio frequency identification units according to the first embodiment of the present invention.

Referring to FIG. 2, there is shown an electronic seal 1 according to a first embodiment of the present invention. The electronic seal 1 includes a plug 100, a radio frequency identification apparatus 200, an impedance matching circuit 300, a socket 400 and an antenna assembly 500.

Figure 3:
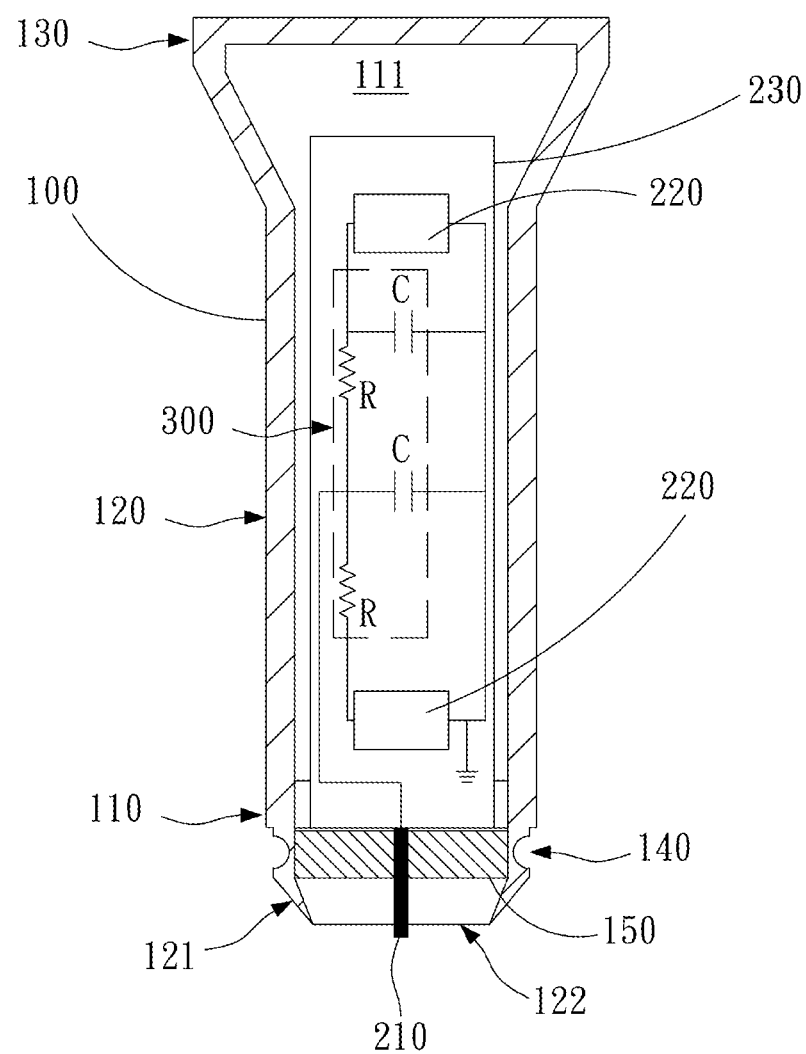
FIG. 3 is a cross-sectional view of a plug of the electronic seal shown in FIG. 2.

Referring to FIG. 3, the plug 100 made of metal is a hollow cylinder and used for containing the radio frequency identification apparatus 200 and the impedance matching circuit 300. The plug 100 is coated with an insulated material. The insulated material may be provided by attaching an insulated sheet to the plug 100 or spraying insulated paint on the plug 100.

Referring to FIG. 3, the plug 100 includes a hollow body 110 formed with an insertion end 120 and a stop end 130. The insertion end 120 of the plug 100 is located at an end of the hollow body 110 while the stop end 130 of the plug 100 is located at an opposite end of the hollow body 110. Taken along planes extending perpendicular to the axis of the pug 100, the cross-sectional area of the stop end 130 of the plug 100 is larger than the cross-sectional area of the hollow body 110.

Referring to FIG. 3, the insertion end 120 of the plug 100 is formed with a guiding chamfer 121. The plug 100 further includes a lock groove 140 defined in the periphery of the insertion end 120. The lock groove 140 may be a continuous ring-groove around the periphery of the insertion end 120 of the plug 100. Alternatively, the lock groove 140 may be a series of separated grooves located around the periphery of the insertion end 120 of the plug 100.

Referring to FIG. 3, the hollow body 110 further includes an internal space 111 defined therein. The insertion end 120 of the plug 100 further includes an opening 122 defined therein. The opening 122 is direct to the internal space 111 of the hollow body 110.

Referring to FIGS. 2 and 3, the radio frequency identification apparatus 200 includes a first electric connector 210 and two radio frequency identification units 220 according to the first embodiment of the present invention. Each of the radio frequency identification units 220 is used to provide a specific code for identification. Both of the radio frequency identification units 220 transmit the specific codes through the antenna assembly 500.

Figure 4:
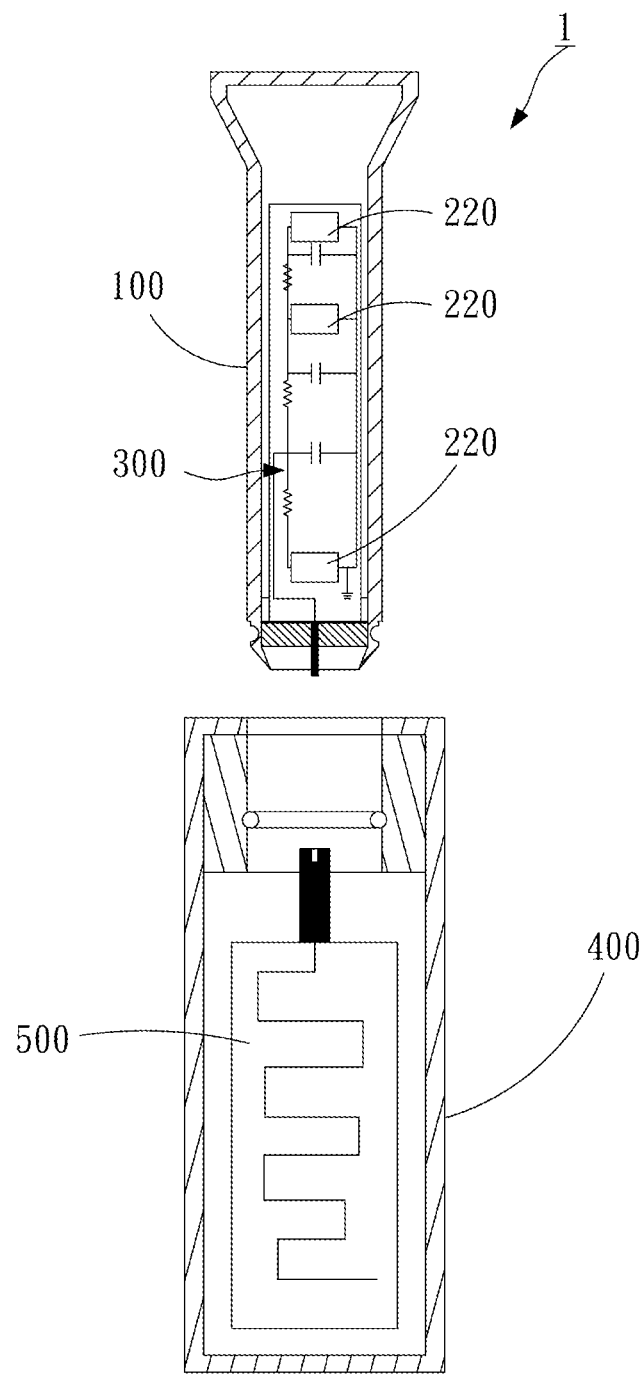
FIG. 4 is a cross-sectional view of an electronic seal including a plurality of radio frequency identification units according to the second embodiment of the present invention.

Referring to FIG. 4, the radio frequency identification apparatus 200 includes a first electric connector 210 and two radio frequency identification units 220 according to a second embodiment of the present invention. It should be noted that the radio frequency identification apparatus 200 may include more than two radio frequency identification units 220 according to the present invention.

Referring to FIG. 3, the plug 100 further includes an insulated block 150 fit in the opening 122 of the insertion end 120 of the plug 100. The insulated block 150 includes an aperture defined therein. The first electric connector 210 is inserted through the aperture of the insulated block 150 so that the first electric connector 210 is securely inserted in the opening 122 of the insertion end 120. Thus, the first electric connector 210 is kept away from the plug 100. That is, the first electric connector 210 is electrically insulated from the plug 100. The first electric connector 210 is connected to the second electric connector 510, thus electrically connecting the radio frequency identification units 220 to the antenna assembly 500 to excite the radio frequency identification unit 220 to transmit the specific codes through the antenna assembly 500.

Referring to FIG. 3, the radio frequency identification units 220 are located in the internal space 111 of the hollow body 110 and electrically connected to the first electric connector 210. Each of the radio frequency identification units 220 includes a specific code for identification. Each of the radio frequency identification units 220 is preferably implemented, but not limited to, a radio frequency identification ("RFID") chip.

Referring to FIG. 3, the radio frequency identification apparatus 200 further includes a first circuit board 230. The radio frequency identification units 220 are provided on the first circuit board 230. The first electric connector 210 is connected to an edge of the first circuit board 230 by soldering.

Referring to FIG. 3, the impedance matching circuit 300 is provided between the radio frequency identification units 220 and the antenna assembly 500 to adjust the matching impedance between the radio frequency identification units 220 and the antenna assembly 500, then to adjust excitation power and feedback power at which the radio frequency identification unit 220 transmit the specific codes through the antenna assembly 500.

Referring to FIG. 3, the impedance matching circuit 300 can be implemented on the first circuit board 230 or separately made and then connected to the first circuit board 230. To a practical case, the impedance matching circuit 300 is connected to the two radio frequency identification units 220 and the first electric connector 210 to adjust the matching impedance of the radio frequency identification units 220 to the first electric connector 210, then to adjust the matching impedance between the two radio frequency identification units 220, thus causing the radio frequency identification units 220 to transmit at different powers so that one of the radio frequency identification units 220 is deemed the major one while the other radio frequency identification unit 220 is deemed the minor one.

Referring to FIG. 3, the impedance matching circuit 300 includes a plurality of impedance units corresponding to the radio frequency identification units 220 to adjust the impedance matching of the radio frequency identification units to the antenna assembly. Each of the impedance units includes a resistor R and a capacitor C. The capacitor C is connected to the related radio frequency identification unit 220 in parallel at one hand and electrically connected to first electric connector 210 through the resistor R at another hand. Thus, the capacitor C is connected to the antenna assembly 500 through the first electric connector 210 and the second electric connector 510. The impedance matching circuit 300 is shown only for example, not for limitation. It should be noted that the resistor R may be a variable resistor to cause the electronic seal 1 to include a specific value of impedance matching. Each of the impedance units includes a resistor R 及 a capacitor C for example. Each of the impedance units may however include a resistor R connected to the antenna assembly 500, an inductor L connected to the antenna assembly in serial, and a capacitor C connected to the antenna assembly 500 in parallel. In fact, each of the impedance units may include any proper combination of these elements.

Figure 5:
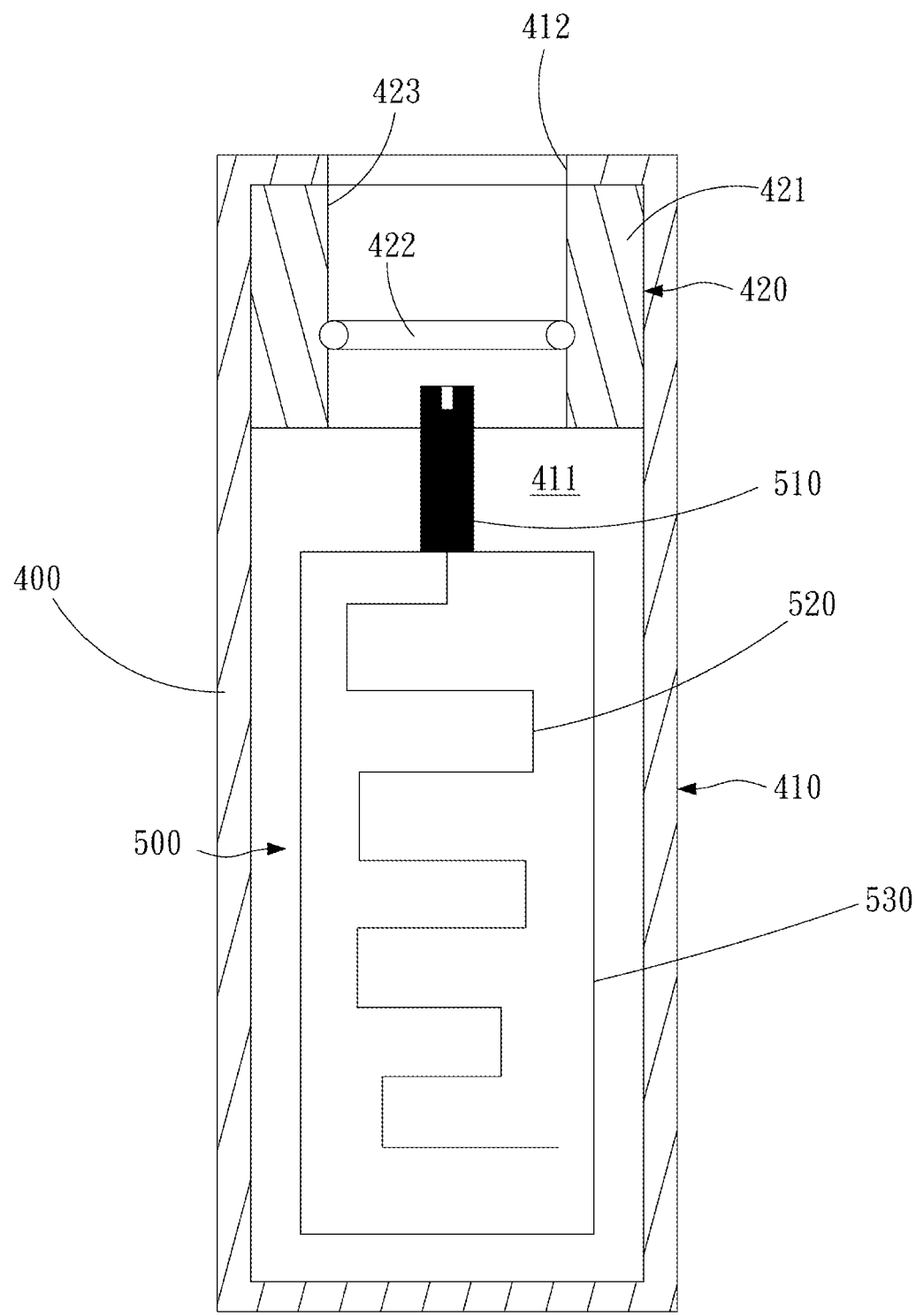
FIG. 5 is a cross-sectional view of a socket of the electronic seal shown in FIG. 2 or 4.

Referring to FIGS. 2 and 5, the socket 400 includes a hollow body 410 and a locking apparatus 420.

Referring to FIG. 5, the hollow body 410 includes an internal space 411 defined therein. The socket 400 further includes an opening 412 defined in the hollow body 410 so that the opening 412 is direct to the internal space 411. The insertion end 120 of the plug 100 is inserted in the internal space 411 through the opening 412. The locking apparatus 420 is located in the internal space 411 of the hollow body 410 corresponding to the opening 412. The locking apparatus 420 is used to engage with the insertion end 120 of the plug 100 to lock the plug 100 to the socket 400.

Referring to FIG. 5, the insertion end 120 of the plug 100 is inserted in the opening 412 of the socket 400. Thus, the insertion end 120 is locked by the locking apparatus 420. That is, the plug 100 cannot be disengaged from the socket 400. As the plug 100 is inserted in the socket 400, the radio frequency identification units 220 are electrically connected to the antenna assembly 500. Thus, the identification units 220 can be excited to transmit the specific codes.

Furthermore, as the insertion end 120 of the plug 100 is inserted in the socket 400, at least one of the radio frequency identification units 220 is inserted in the socket 400. Thus, as the plug 100 is cut, there is at least one radio frequency identification unit 220 left in the socket 400.

Referring to FIG. 5, in an embodiment, the locking apparatus 420 includes a ring 421 and an elastic lock 422. The ring 421 includes a locking opening 423 defined in the ring 421. The locking opening 423 is defined corresponding to the opening 412 of the hollow body 410. The elastic lock 422 includes an external portion fit in the wall of the locking opening 423 and an internal portion to be fit in the lock groove 140 of the plug 100 so that the insertion end 120 of the plug 100 is locked by the locking apparatus 420.

Referring to FIGS. 3 through 5, after the insertion end 120 of the plug 100 is inserted in the opening 412, the insertion end 120 of the plug 110 can continue to be inserted in the locking opening 423. The guiding chamfer 121 facilitates the sequential insertion of the insertion end 120 of the plug 100 through the opening 412 and the locking opening 423. As the insertion end 120 of the plug 100 is inserted in the locking opening 423, the elastic lock 422 is fit in the lock groove 140 of the plug 100 so that the insertion end 120 of the plug 100 is locked by the locking apparatus 420. The ring 421 is generally made by tapping in metal and exhibits an excellent strength against shearing. As the insertion end 120 of the plug 100 is retained in the locking opening 423, there is at least one radio frequency identification unit 220 inserted in the locking opening 423 and therefore protected by the ring 421, thus reducing the possibility of the radio frequency identification unit 220 be broken when the plug 100 is cut.

Figure 6:
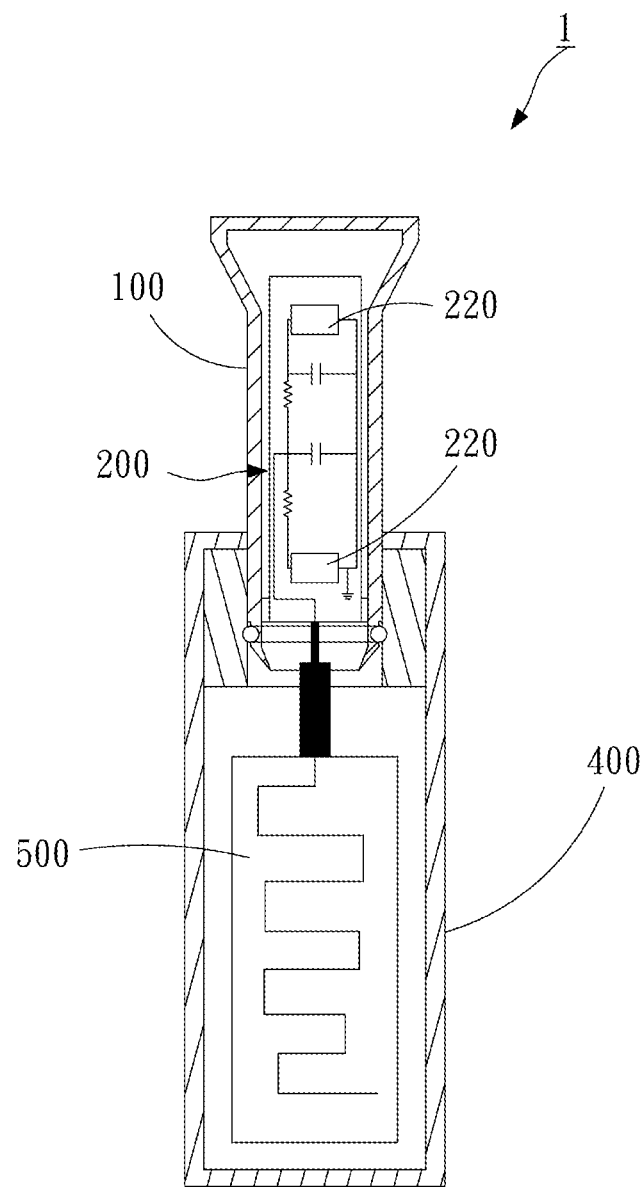
FIG. 6 is a cross-sectional view of the plug inserted in the socket of the electronic seal shown in FIG. 2.

Referring to FIGS. 5 and 6, the antenna assembly 500 is inserted in the socket 400.

Referring to FIG. 6, as the insertion end 120 of the plug 100 is inserted in the socket 400, the antenna assembly 500 is electrically connected to the radio frequency identification units 220 of the radio frequency identification apparatus 200 to receive an electromagnetic signal for identification to excite the radio frequency identification units 220 to transmit the specific codes via the antenna assembly 500. The electromagnetic signal for identification is transmitted from a radio frequency reader. The specific codes can be read by the radio frequency reader for identification. As discussed above, when the plug 100 is cut, the insertion end 120 of the plug 100 is still locked by the locking apparatus 420 so that at least one radio frequency identification unit 220 is left in the socket 400 together with the insertion end 120 of the plug 100 and can transmit the specific code through the antenna assembly 500.

Referring to FIG. 5, in an embodiment, the antenna assembly 500 includes a second electric connector 510 and at least one antenna 520 located in the internal space 411 of the hollow body 410. The second electric connector 510 is located corresponding to the locking opening 423. For example, the second connector 510 is inserted in the locking opening 423 or inserted in the opening 412 through the locking opening 423. As the insertion end 120 of the plug 100 is inserted in the locking opening 423, the first electric connector 210 is engaged with the second electric connector 510. The first electric connector 210 and the second electric connector 510 may be a combination of terminal or a plug with socket.

The antenna 520 is electrically connected to the second electric connector 510. Hence, the antenna 520 is electrically connected to the radio frequency identification units 220 of the radio frequency identification apparatus 200 via the first electric connector 210 and the second electric connector 510 to transmit the specific codes carried on the radio frequency identification units 220.

Referring to FIG. 5, in an embodiment of the antenna assembly 500, the antenna assembly 500 further includes a carrier board 530 such as a printed circuit board ("PCB"). The antenna 520 is provided on the carrier board 530, and the second electric connector 510 is connected to an edge of the carrier board 530, and is electrically connected to the antenna 520.

When the electronic seal 1, which includes the radio frequency identification units 220, receives the electromagnetic signal from the external radio frequency identification reader, the impedance matching circuit 300 causes the radio frequency identification units 220 located in the plug 100 to receive the electromagnetic signal at different powers. This difference brings three results as follows:

1. The electromagnetic signal is received at different powers so that one of the radio frequency identification units 220 does not receive enough energy to transmit the specific code in response.
2. Two or more of the radio frequency identification units 220 receive enough energy to transmit the specific codes in response but the responsive radio frequency signals exhibit different intensities because of the impedance matching so that the radio frequency reader receive the responsive radio frequency signals with different intensities; and
3. The distance between the radio frequency identification reader and the electronic seal 1 is varied. In specific, the radio frequency identification reader approaches the electronic seal 1 so that the radio frequency identification reader receives the specific codes from the radio frequency identification units 220 one after another. That is, there is a sequence of points of time at which the radio frequency identification reader receives the specific codes from the radio frequency identification units 220.

In use, as the plug 100 is inserted through a latch of a container or a bond truck, and the insertion end 120 of the plug 100 is inserted in the socket 400 and locked by the locking apparatus 420, the radio frequency identification units 220 of the electronic seal 1 are connected to the antenna assembly 500 because of the engagement of the first electric connector 210 with the second electric connector 510, thus forming a radio frequency identification system.

As the radio frequency identification reader transmits the electromagnetic signal for identification, the antenna assembly 500 of the electronic seal 1, which includes the radio frequency identification units 220, receives the electromagnetic signal for identification and transfers the signal to the radio frequency identification units 220 to excite the radio frequency identification units 220 to transmits the specific codes through the antenna assembly 500. By the integrity of the specific codes, the security of the container and the bond truck is finally determined.

Moreover, as there is a plurality of radio frequency identification units 220, at least one of the radio frequency identification units 220 records the data of the goods in the container by the specific code. When two specific codes are received, one of the specific codes is used to determine whether the electronic seal 1 has been replaced with another one, while the other specific code can be used to reveal data of the goods contained in the container.

Figure 7:
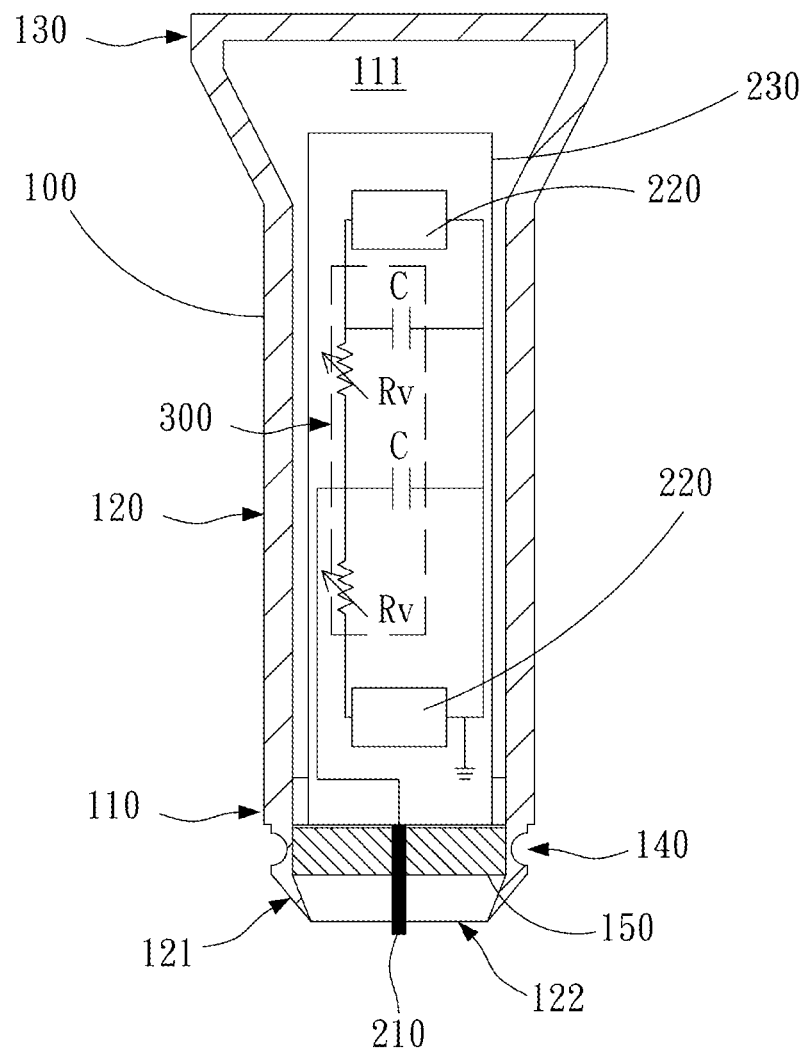
FIG. 7 is a cross-sectional view of a plug of an electronic seal including a plurality of radio frequency identification units according to the third embodiment of the present invention.

Referring to FIG. 7, an electronic seal 1 includes a plug 100, a radio frequency identification apparatus 200 and an impedance matching circuit 300 according to a third embodiment of the present invention.

The impedance matching circuit 300 includes a plurality of impedance units corresponding to the radio frequency identification units 220. Each of the impedance units includes a variable resistor Rv and a capacitor C. The variable resistor Rv causes each of the impedance units to provide a variable impedance to a related one of the radio frequency identification units 220. The different values of the impedance matching result in variable power distribution because of various ratios of values of the impedance units. When the impedance matching results in a large difference between the values of impedance, the radio frequency identification units 220 with the larger impedance cannot be excited to transmit the specific code in response to the radio frequency identification signal sent from the radio frequency identification reader, and vice versa.

The difference between the values of impedance represents the distribution of the powers of the radio frequency identification signals in response to the radio frequency identification reader. Therefore, in the third embodiment, the two values of impedance are adjusted to be identical to each other. Both of the radio frequency identification units 220 transmit the specific codes in response, and the radio frequency identification reader receives the signals from the radio frequency identification units 220. That is, it is difficult to illegally record a right one of the specific codes since there are two specific codes and one of these two specific code is used as a decoy. An illegally recorded specific code is compared with the original design to determine whether the specific code is recorded illegally. By adjusting the impedance matching between the radio frequency identification units 220 of the plug 100, there will cause different results of reading for the radio frequency identification reader. Hence, the electric seal 1 can be used as a high-security radio frequency identification electric lock and be used to confuse an illegal recorder who does not know the original design of the plug 100. Hence, the values of impedance are variable because the impedance matching is adjustable. Accordingly, the intensities of the received specific codes are variable for confusing the illegal recorder.

As discussed above, when a person tries to illegally record the specific code with the radio frequency identification reader, the person receives several specific codes and get confused and cannot decide to record which one of the specific codes for counterfeiting the electronic seal 1. Alternatively, several specific codes are received for the electronic seal 1 with different intensities. The illegal recorder however does not have access to the relation among the different intensities although he or she can obtain the specific codes. Thus, the difficulty of counterfeiting the electronic seal 1 is increased.

Figure 8:
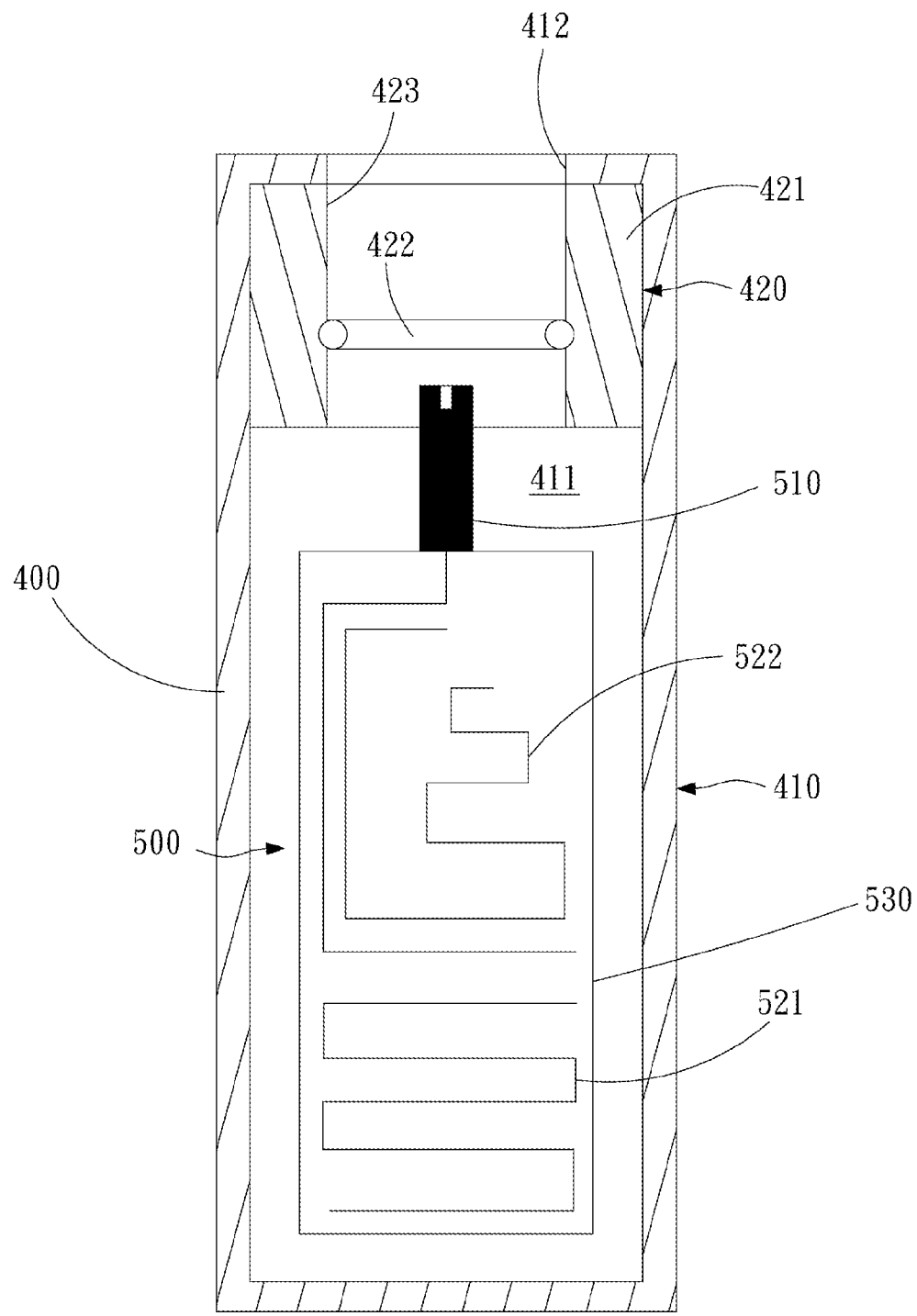
FIG. 8 is a cross-sectional view of a socket of an electronic seal including a plurality of radio frequency identification units according to the fourth embodiment of the present invention.

Referring to FIG. 8, there is shown an electronic seal according to a fourth embodiment of the present invention that includes a different socket 400 and antenna assembly 500.

The antenna assembly 500 includes a plurality of antennas. In specific, the antennas are of different types. For example, the antennas include a one-point feed-in antenna 521 and a coupling antenna 522. The one-point feed-in antenna 521 is electrically connected to the second electric connector 510 while the coupling antenna 522 is coupled to the one-point feed-in antenna 521.

In the fourth embodiment, the plurality of antennas increases the area of interception of the receipt and transmission of radio signals. Thus, the electronic seal 1 with the radio frequency identification units is identifiable at a longer distance. Furthermore, the identification rate of the radio frequency identification units 220 is increased. That is, the possibility of wrong reading or failure to read is reduced.

Figure 9:
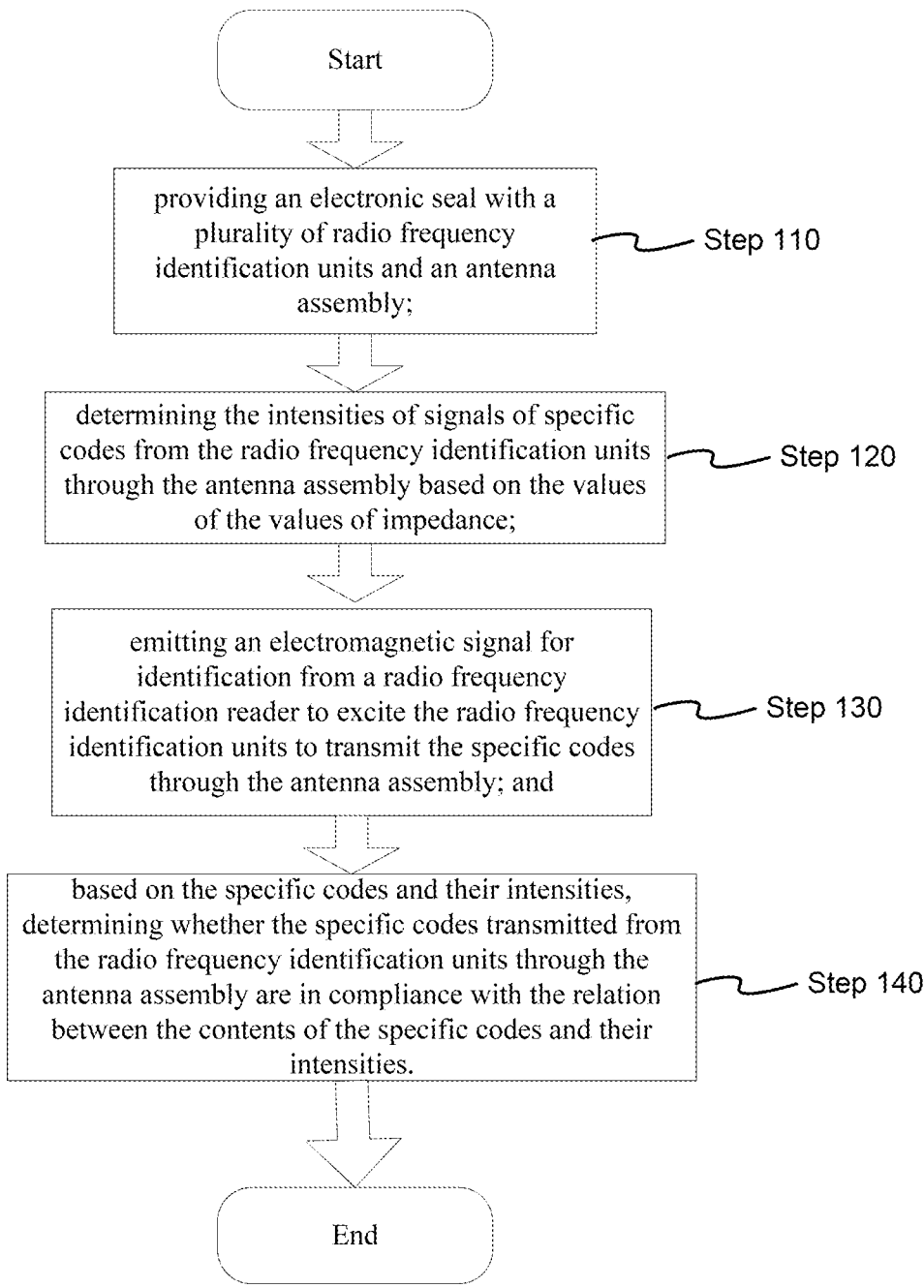
FIG. 9 is a block diagram of a method for inspecting goods based on an electronic seal according to the fifth embodiment of the present invention.

Referring to FIG. 9, there is shown a method for inspecting goods wrapped in a package, based on an electronic seal. The package includes a latch. The electronic seal 1 is inserted through the latch and locked. Thus, the package is locked. The package may be a container or a carriage of a bond truck. The latch is used to lock the container or the carriage of the bond truck.

A method of inspecting goods includes the following steps:

At Step 110, there is provided an electronic seal 1. The electronic seal 1 includes a plurality of radio frequency identification units 220 and an antenna assembly 500. The radio frequency identification units 220 are engaged with the antenna assembly 500 after they are inserted through the latch. Between each radio frequency identification unit 220 and the antenna assembly 500, there exists impedance.

At Step 120, based on the values of the values of impedance, the intensities of signals of specific codes from the radio frequency identification units 200 through the antenna assembly 500 are determined to set the uniqueness of the code and intensity of the electronic seal.

At Step 130, an electromagnetic signal for identification is emitted from a radio frequency identification reader to excite the radio frequency identification units 220 to transmit the specific codes through the antenna assembly 500.

At Step 140, based on the specific codes and their intensities, it is determined whether the specific codes transmitted from the radio frequency identification units 220 through the antenna assembly 500 are in compliance with the relation between the contents of the specific codes and their intensities.

The relation of the intensities of the specific codes may be that the intensities of the specific codes are consistent, that the intensities of the specific codes are different, or that some of the specific codes are disabled.

Because the relation of the intensities of the specific codes cannot be obtained in illegal recording, the plurality of specific codes can include at least one decoy for confusing the illegal recording. Furthermore, the values of impedance of the radio frequency identification units 220 can be changed in a motive manner to increase the number of changes in the relation of the intensities of the specific codes. That is, by adjusting the matching impedance of a radio frequency identification apparatus, the relation between two specific codes can be changed, thus increasing the difficulty in counterfeiting the electronic seal 1.

Moreover, one of the specific codes may include information related to security while the other specific code may include information related to the goods to make sure that the electronic seal 1 is not replaced with a counterfeit one and that the content of the goods in the container or carriage of the bond truck can be known.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An electronic seal including:
   a plug including a hollow body, an insertion end formed at an end of the hollow body, and a stop end formed at an opposite end of the hollow body, wherein a cross-sectional area of the stop end of the plug is larger than a cross-sectional area of the hollow body;
   a socket including a hollow body and a locking apparatus, wherein the hollow body of the socket includes an internal space defined therein and an opening through which the insertion end of the plug is insertable in the internal space of the hollow body of the socket, wherein the locking apparatus is located in the internal space of the hollow body of the socket corresponding to the opening of the hollow body of the socket for receiving the insertion end of the plug to thereby lock the plug to the socket,
   a radio frequency identification apparatus including at least two radio frequency identification units, each for providing a specific code for identification and arranged within the hollow body of the plug such that at least one of the radio frequency identification units is arranged so as to also be encased by the socket when the plug is fully inserted in the socket;
   an antenna assembly arranged in the socket and electrically connected to the radio frequency identification units when the plug is inserted in and locked to the socket, wherein the antenna assembly is used to receive an electromagnetic signal for identification to excite the radio frequency identification units to transmit the specific codes through the antenna assembly, wherein when the plug is cut, the at least one radio frequency identification unit is left unbroken in the socket together with the insertion end of the plug and can transmit the specific code through the antenna assembly; and
   an impedance matching circuit provided between the radio frequency identification units and the antenna assembly for adjusting the impedance matching of the radio frequency identification units to the antenna assembly, thus adjusting excitation powers and feedback powers of the specific codes transmitted from the radio frequency identification units through the antenna assembly.

2. The electronic seal according to claim 1, wherein the plug further includes a lock groove defined in an external side of the insertion end.

3. The electronic seal according to claim 1, wherein the insertion end includes an opening defined therein which is direct to the internal space of the plug.

4. The electronic seal according to claim 3, wherein the plug further includes an insulation block fit in the opening of the insertion end of the plug, wherein the radio frequency identification apparatus further includes the first electric connector electrically connected to the radio frequency identification units and inserted through the insulation block.

5. The electronic seal according to claim 1, further including a plurality of impedance units corresponding to the radio frequency identification units for adjusting the values of impedance of the radio frequency identification units to the antenna assembly.

6. The electronic seal according to claim 5, wherein each of the impedance units includes a resistor connected to the antenna assembly in serial, an inductor connected to the antenna assembly in serial, and a capacitor connected to the antenna assembly in parallel, or any combinations of these passive components.

7. The electronic seal according to claim 1, wherein the antenna assembly includes a one-point feed-in antenna and a coupling antenna, wherein the one-point feed-in antenna is electrically connected to the radio frequency identification units while the coupling antenna is coupled to the one-point feed-in antenna.

8. A method, for inspecting goods contained in a package equipped with a latch, the method including the steps of:
   providing an electronic seal with a plurality of radio frequency identification units and an antenna assembly, wherein the radio frequency identification units are engaged with the antenna assembly after the electronic seal is inserted through the latch, wherein a specific value of impedance exists between each of the radio frequency identification units and the antenna assembly;
   values of impedance determine intensities of signals of specific codes from the radio frequency identification units through the antenna assembly, this leads the electronic seal to have a specific relation of the codes and their signal intensities;

emitting an electromagnetic signal for identification from a radio frequency identification reader to excite the radio frequency identification units to transmit the specific codes through the antenna assembly at the respective signal intensities; and based on the specific codes and their respective signal intensities, determining whether the specific codes transmitted from the radio frequency identification units at the respective signal intensities through the antenna assembly are in compliance with an expected relation between the contents of the specific codes and their respective signal intensities.

9. The method according to claim 8, wherein the relation of intensities and the specific codes is selected from the group consisting of that the intensities of the specific codes are consistent, that the intensities of the specific codes are different, and that some of the specific codes are disabled.

* * * * *